US006791569B1

(12) United States Patent
Millet et al.

(10) Patent No.: US 6,791,569 B1
(45) Date of Patent: Sep. 14, 2004

(54) ANTIALIASING METHOD USING BARYCENTRIC COORDINATES APPLIED TO LINES

(75) Inventors: Timothy Millet, Mountain View, CA (US); Zahid S. Hussain, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/348,882

(22) Filed: Jul. 1, 1999

(51) Int. Cl.[7] ................................................ G09G 5/00
(52) U.S. Cl. ........................................ 345/611; 345/581
(58) Field of Search ................. 345/430, 431, 345/423, 432, 426, 552, 615, 611, 596, 589, 647, 582, 581; 382/254, 109, 141, 154, 264, 269, 285

(56) References Cited

U.S. PATENT DOCUMENTS

| | | | | |
|---|---|---|---|---|
| 5,361,386 A | * | 11/1994 | Watkins et al. | 345/647 |
| 5,381,519 A | * | 1/1995 | Brown et al. | 345/596 |
| 5,602,979 A | * | 2/1997 | Loop | 345/423 |
| 5,715,166 A | * | 2/1998 | Besl et al. | 700/182 |
| 5,809,219 A | * | 9/1998 | Pearce et al. | 345/426 |
| 5,844,567 A | * | 12/1998 | Gossett et al. | 345/430 |
| 6,038,031 A | * | 3/2000 | Murphy | 382/254 |
| 6,104,415 A | * | 8/2000 | Gossett | 345/552 |
| 6,597,363 B1 | * | 7/2003 | Duluk et al. | 345/506 |

* cited by examiner

Primary Examiner—Michael Razavi
Assistant Examiner—Thu-Thao Havan
(74) Attorney, Agent, or Firm—Woodcock Washburn LLP

(57) ABSTRACT

A method for computing normalized minor axis distance to an ideal line for variable-width line antialiasing. The method involves performing line primitive setup by constructing a triangle from the two line vertices and a third vertex biased from a line endpoint by the line width/2. Normalized barycentric coordinates are computed for this triangle, which together can be used for primitive attribute interpolation. One of the barycentric coordinates contains the normalized minor-axis distance to the ideal line, which can be used with a slope-correct coverage table to compute coverage. Because the minor-axis distance is normalized, the coverage value is independent of line width.

20 Claims, 7 Drawing Sheets

ANTIALIASING METHOD USING BARYCENTRIC COORDINATES APPLIED TO LINES

FIELD OF THE INVENTION

The present invention relates to a method for providing antialiasing to a computer displayed line. More specifically, the present invention pertains to a method applying barycentric coordinates for computing a normalized minor axis distance to an ideal line which can then be used as part of the antialiasing technique.

BACKGROUND OF THE INVENTION

Today, computer graphics is used in a wide variety of applications, such as in business, science, animation, simulation, computer-aided design, process control, electronic publication, etc. Basically, computer generated graphics are comprised of points, lines, and polygons, which collectively are referred to as "primitives." These primitives are then rendered to display realistic two-dimensional and three-dimensional objects, images, and scenes. A complex three-dimensional scene may contain upwards of millions of such primitives.

The way by which primitives are rendered involves a scan conversion process. Basically, a computer screen is made up of millions of pixels (e.g., 980×1024 monitor). The scan conversion process determines which pixels of a computer screen belong to which of the primitives. The pixels are then assigned attributes, such as color, depth, and blending, corresponding to the appropriate primitive. By way of example, FIG. 1 shows a small 5×11 array of pixels. Each individual pixel is represented, for purposes of illustration, as a square, and the pixel centers are represented as dots. A line can be represented by defining its endpoints. In FIG. 1, the vertices 110 and 111 define an ideal line 112. This straight horizontal line can be rendered for display by assigning a black color to pixels 101–109, while maintaining the other pixels in an unchanged white background color.

Unfortunately, complications arise if a line is slanted, such that it is not either perfectly horizontal or vertical. FIG. 2 shows a slanted line 203. The ideal line 203 is defined by its endpoints which have vertices at 201 and 202. Ideal line 203 passes through pixels 204–216; assigning a black color to these pixels will produce the desired slanted line. However, as can be seen, the resulting line has a "stair-stepped" or "jagged" appearance. Due to the aliases, the displayed line is not smooth and is visually unappealing. The effect of aliasing with respect to lines is particularly disturbing in scenes involving movement. Aliased lines appear to be scintillating.

In order to minimize the effects of line aliasing, designers have implemented a number of clever and useful antialiasing techniques. Antialiasing techniques typically blend the pixel as a function of coverage. Those pixel centers located further away from the ideal line are blended with the background color such that the line color has less effect than those pixels whose centers are closer to the ideal line. Essentially, the greater the pixel area covered by the line, the greater the line's attribute contributes to that particular pixel. Referring back to the example shown in FIG. 2, the center of pixel 206 is relatively far away from ideal line 203. This means that the area of pixel 206 covered by ideal line 203 is relatively small. The final color value assigned to pixel 206 is a blended function of the line color and the background color. But because of the relatively small coverage value, the background color is assigned a higher weighting than that of the line color. Consequently, the final color for pixel 206 is closer to that of the background color than the line color. In contrast, the center of pixel 207 is extremely close to that of ideal line 203. This indicates that the area of pixel 207 covered by line 203 is relatively quite large (e.g. 50%). Thus, the line color is assigned a higher weighting than that of the background color for pixel 207. By way of example, given a white background and a black line, pixel 206 would have a very light gray color, whereas pixel 207 would have a much darker gray color. Rather than having a pixel be either black or white, the anti-aliasing technique assigns varying degrees of black, gray, and white. By blending an interpolated line color with the background color, a smoother, straighter, and more realistic display is produced.

Although these types of anti-aliasing techniques are quite effective, they are computationally expensive. For each pixel, the minor axis distance must be calculated, and the coverage must be determined before blending can occur. Calculating the minor axis distance for each sample point as the line is traversed typically entails computing an initial value for the first sample point, forward biasing this value as the line is traversed through linear interpolation, and performing difference calculations to determine the current sample point with respect to the ideal line. These calculations consume valuable time and processing resources. As such, some computers become overwhelmed and are simply incapable of handling high-quality antialiasing for complex, three-dimensional scenes, especially those involving real-time, interactive graphics. Furthermore, antialiasing techniques become even more problematic for lines which are thicker than one pixel wide. It can be difficult to adapt standard antialiasing techniques to these variable width lines.

Thus, there exists a need for a system and method which can readily and accurately calculate the minor axis distance from a sample point to an ideal line for purposes of facilitating antialiasing. It would be preferable if such a system and method were to generate normalized distances so that standard anti-aliasing techniques are readily adapted to handle variable width lines. The present invention provides a novel solution which meets the above needs and which is computationally inexpensive.

SUMMARY OF THE INVENTION

The present invention pertains to a method for applying the principles of barycentric coordinates to perform anti-aliasing for a computer generated line. A line is defined by its two endpoints. In the present invention, a third point is specified for the purpose of forming a triangle defined by the two endpoints and the third point. Thereby, subarea computations can be performed for any pixel sample point relative to this triangle in order to generate barycentric coordinates which uniquely define that particular sample point. The three barycentric coordinates corresponding to the triangle are then mapped to create two barycentric coordinates, one for each of the two endpoints. An interpolated pixel color can be calculated as a function of these two barycentric coordinates applied to the color of the pixels corresponding to the two endpoints. One of the barycentric coordinates gives the relative minor axis distance from the sample point to the line. This barycentric coordinate is used as an index into a table containing pre-computed coverage values. The appropriate coverage value is then used to modulate a blending value, alpha. The interpolated pixel color is then blended with the background color according to the alpha value.

BRIEF DESCRIPTION OF THE DRAWINGS

The present invention is illustrated by way of example, and not by way of limitation, in the figures of the accompanying drawings and in which like reference numerals refer to similar elements and in which:

Figures 1, 2:
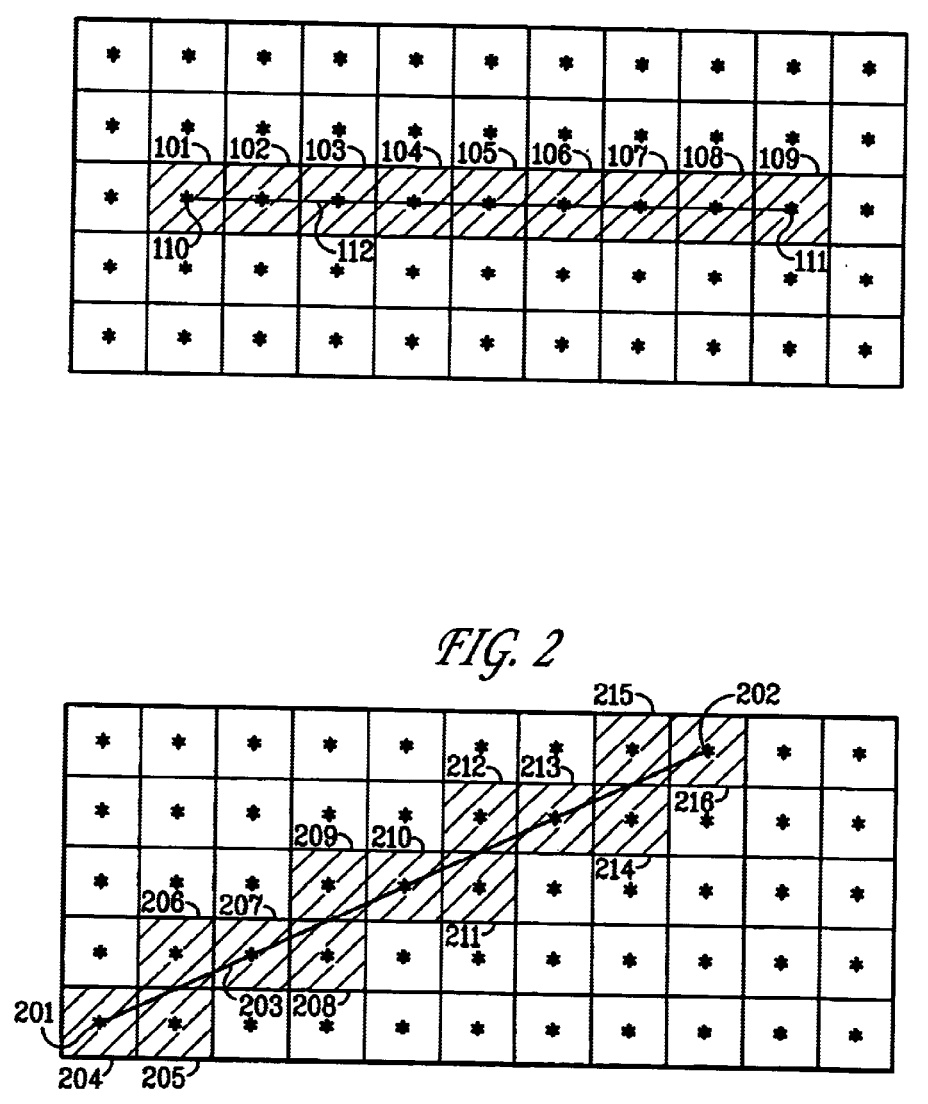

FIG. 1 shows a small 5×11 array of pixels upon which a line may be drawn for display.

FIG. 2 shows a slanted line without antialiasing.

DETAILED DESCRIPTION

A method for computing a normalized minor axis distance to an ideal line for single pixel and variable width line antialiasing is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 3:
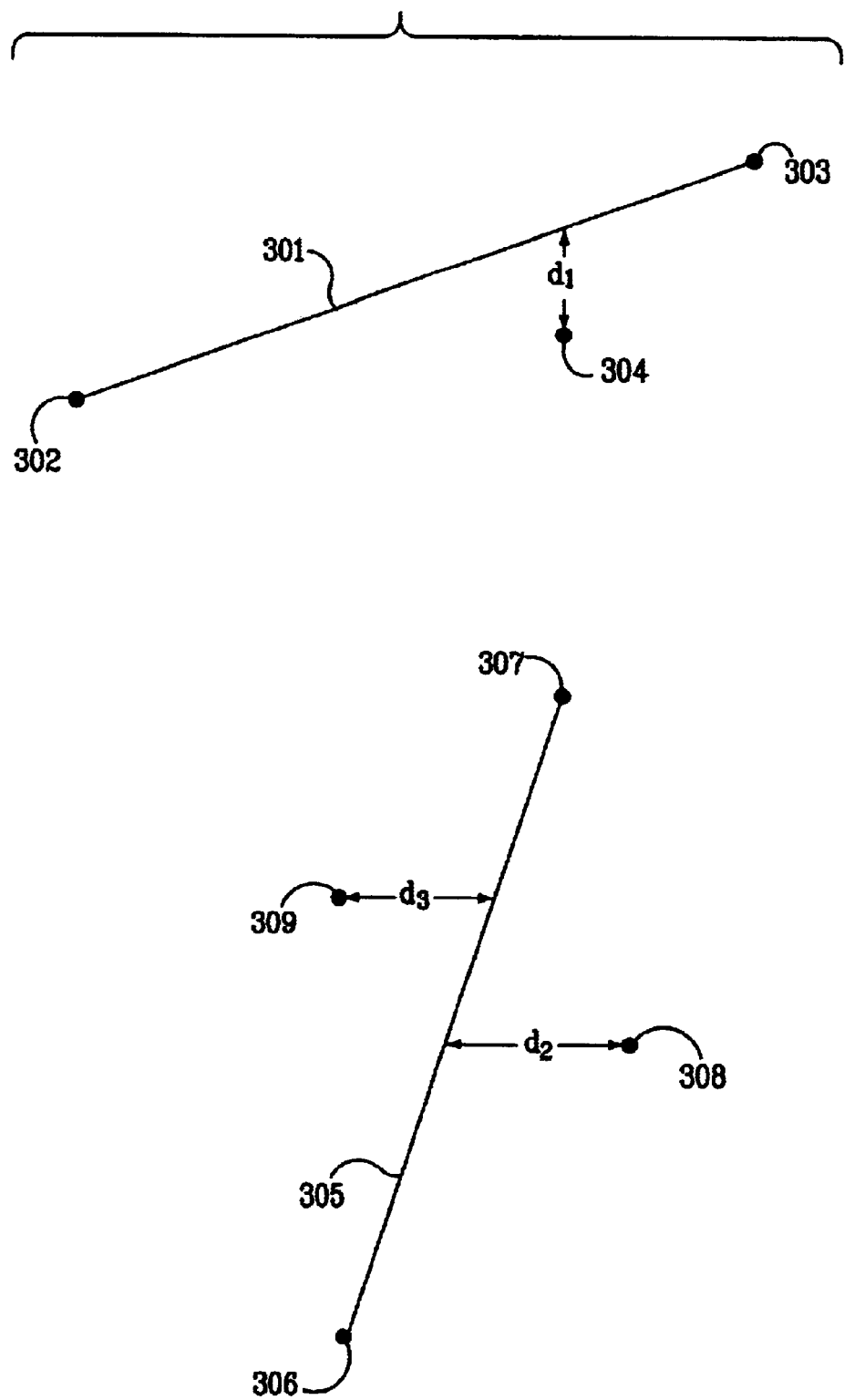
FIG. 3 shows two slanted lines and their corresponding minor axes.

The present invention utilizes the principles relating to barycentric coordinates to calculate the minor-axis distance from a sample point to an ideal line. The minor axis is defined as being the y-axis (vertical) if the slope of the ideal line is less than +½ and greater than −½. The minor axis is defined as being the x-axis (horizontal) if the slope of the ideal line is greater than +½ or less than −½. If the slope of the ideal line is exactly ½ (e.g., 45 degrees), then the minor axis can be either the x or y axis because they both yield the same result. The minor axis distance is the distance measured from the sample point in the minor axis direction (e.g., either horizontal or vertical) to the ideal line. FIG. 3 shows two slanted lines 301 and 305. Ideal line 301 is defined by vertices 302 and 303, its two endpoints. Because ideal line 301 is predominately horizontal, its minor axis is the y-axis. A sample point 304 is shown. Sample point 304 can correspond to the center of a pixel or the center of a pixel fragment. Hence, the minor axis distance corresponding to sample point 304 and ideal line 301 is given by $d_1$. Likewise, ideal line 305 is specified according to its two vertices 306 and 307. The slope of ideal line 305 is such that its minor axis is the x-axis. Hence for sample point 308, its minor axis distance is given as $d_2$. Similarly, for a different sample point 309, its minor axis distance to ideal line 305 is shown as $d_3$.

These minor axis distances are calculated in order to determine coverage values. The coverage values are usually determined by indexing the minor axis distances to a table containing pre-computed coverage values. In the past, the minor axis distances were calculated by a brute force approach. However, the present inventors have discovered that the principles governing barycentric coordinates can also be applied to lines.

Mathematically, barycentric coordinates are limited to two-dimensional polygons having an area. As applied to polygons, barycentric coordinates are very useful for calculating coverages. Virtually all computer generated three-dimensional objects are fashioned from a mesh of interconnected polygons (triangles). The barycentric coordinates for a triangle are defined as a set of three numbers a, b, and c, each of which are in the range between 0 and 1 [0,1], and whereby a+b+c=1. These coordinates uniquely specify any point p within the triangle or on the triangles boundary as $p=ap_a+bp_b+cp_c$, where $p_a$, $p_b$, and $p_c$ are the vertices of the triangle. The barycentric coordinates a, b, and c can be calculated as $a=\{A(pp_bp_c)/A(p_ap_bp_c)\}$ $b=\{A(pp_ap_c)/A(p_ap_bp_c)\}$ $c=\{A(pp_ap_b)/A(p_ap_bp_c)\}$, where A(lmn) denotes the area in window coordinates of the triangle with vertices l, m, and n.

Figure 4:
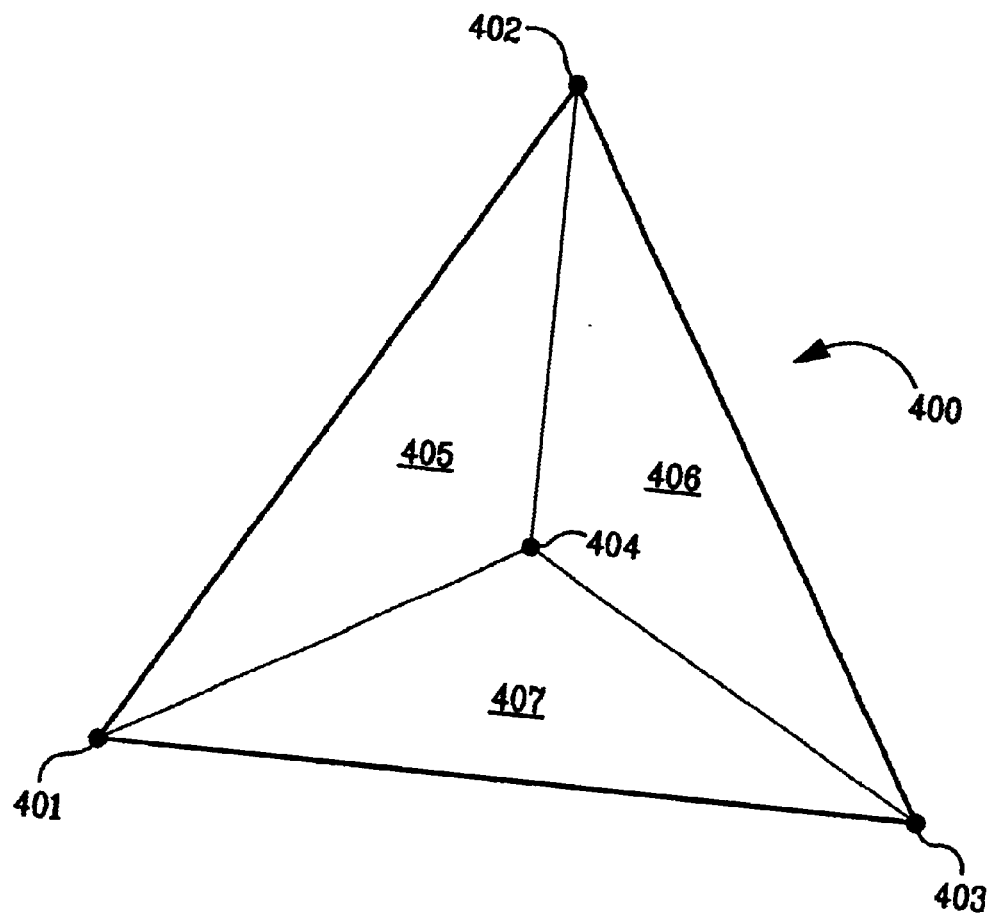
FIG. 4 shows a triangle to which barycentric coordinates can be computed.

For instance, FIG. 4 shows a triangle 400. Triangle 401 is defined by its three vertices 401–403. Assume that it is desired to calculate the color for a pixel denoted by its sample point 404, which resides within triangle 400. Clearly, the pixel would have a color which is an interpolated function of the colors corresponding to the colors at vertices 401–403. However, the exact contributions each of the vertices contribute towards the final interpolated color value for that pixel must be calculated. The interpolation is a function of the barycentric coordinates. To compute the barycentric coordinates for sample point 404, triangle 400 is subdivided into three, smaller triangles 405, 406, and 407. Triangle 405 has vertices 401, 402, and 404; triangle 406 has vertices 402, 403, and 404; and triangle 407 has vertices 401, 403, and 404. The barycentric coordinates are calculated as:

a={(area of triangle 405)/(area of triangle 400)} b={(area of triangle 406)/(area of triangle 400)} c={(area of triangle 407)/(area of triangle 400)}

In other words, the barycentric coordinates are:

barycentric coordinate corresponding to vertex 401=(area defined by vertices 402, 403, and 404)/(area of triangle defined by vertices 401, 402, and 403);

barycentric coordinate corresponding to vertex 402=(area defined by vertices 401, 403, and 404)/(area of triangle defined by vertices 401, 402, and 403); and the barycentric coordinate corresponding to vertex 403=(area defined by vertices 401, 402, and 404)/(area of triangle defined by vertices 401, 402, and 403).

Once the barycentric coordinates have been calculated, the interpolated pixel color is then readily calculated as a function of these barycentric coordinates. The interpolated pixel color is the barycentric coordinate corresponding to vertex 401 times the color of vertex 401, plus the barycentric coordinate corresponding to vertex 402 times the color for vertex 402, plus the barycentric coordinate corresponding to vertex 403 times the color for vertex 403.

But since barycentric coordinates are mathematically limited to two-dimensional objects having areas, and whereas lines are one dimensional (length only), it was hitherto thought impossible to apply barycentric coordinates to lines. However, the present inventors have discovered that a third point may be artificially introduced such that the two vertices (endpoints) of the ideal line, in combination with the artificial third point, define a triangle. Thereby, barycentric coordinates can now be used to perform interpolation and coverage computations. In the currently preferred embodiment, the artificially introduced third point is selected to be exactly half the line width in the direction of the minor axis (either positive or negative) and can be located at either of the ideal line's two endpoints. Of course, the present invention encompasses other points at which the artificial third point may be located.

Figure 5:
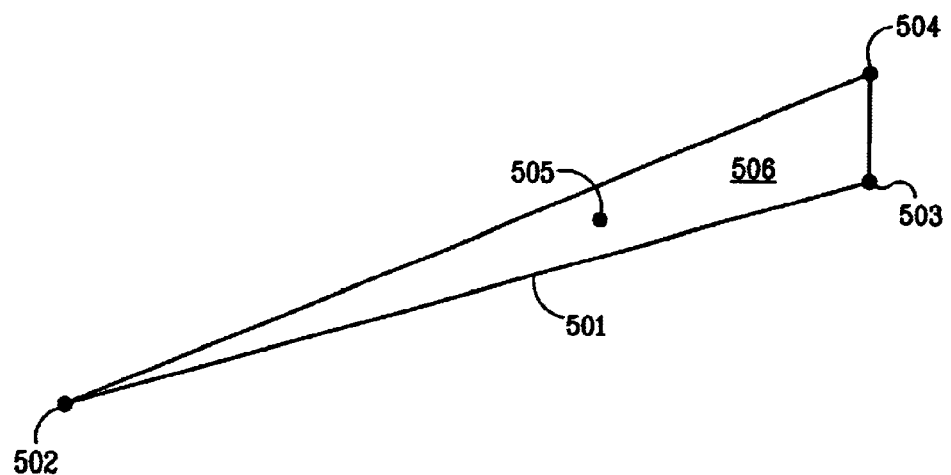
FIG. 5 shows an ideal line with an artificially introduced third point.

FIG. 5 shows an ideal line with an artificially introduced third point. The ideal line 501 has two endpoints 502 and 503. Arbitrarily, endpoint 503 is selected for placing the artificial third point 504. Since line 501 has a slope less than +½ and greater than −½, its minor axis is in the y-axis. A distance equal to half of the line width is added to the y coordinate of vertex 503 to give the y coordinate for point 504. For example, if the width of line 501 is to be two pixels wide, the x coordinate for point 503 is the same as the x coordinate for vertex 503, and the y coordinate for point 503 would be the y coordinate for vertex 503 plus one pixel. It should be noted that the artificially introduced point can be made at either vertex and can be above or below either of the two end points. Now, given a triangle defined by the vertices 502, 503, and 504, the barycentric coordinates for any sample point can be derived as described above. The same process used to calculate barycentric coordinates for determining coverage values for polygons may now be applied to an ideal line, provided that the three barycentric coordinates are appropriately mapped to two endpoints.

An example is now offered to demonstrate how antialiasing may be accomplished by applying barycentric coordinates to an ideal line. Suppose that a sample point resides at point 505. The barycentric coordinate for vertex 502 is computed to be the area of the sub-triangle having vertices 503, 504, and 505 divided by the area of the large triangle having vertices 502, 503, and 504. The barycentric coordinate for vertex 503 is computed to be the area of the sub-triangle having vertices 502, 504, and 505 divided by the area of the large triangle having vertices 502, 503, and 504. And the barycentric coordinate for vertex 504 is computed to be the area of the sub-triangle having vertices 502, 503, and 505 divided by the area of the large triangle having vertices 502, 503, and 504. However, there are three barycentric coordinates and only two endpoints. Hence, to derive comparable weighting factors for just the two endpoints, the three barycentric coordinates must be mapped to the two endpoints. This is accomplished by adding the barycentric coordinate corresponding to the artificial vertex to the barycentric coordinate of the endpoint located corresponding to its minor axis. In this example, the barycentric coordinate of vertex 504 is added to the barycentric coordinate for vertex 503 to give the final barycentric coordinate for the endpoint represented by vertex 503. The barycentric coordinate for endpoint, vertex 502, remains unchanged. Note that the sum of the final two barycentric coordinates for the two endpoints still equal one. The interpolated color for sample point 505 is calculated by multiplying the barycentric coordinate of endpoint 502 by the color value associated with endpoint 502; multiplying the mapped barycentric coordinate of endpoint 503 (e.g., the combined barycentric coordinates of vertices 503 and 504) by the color value associated with endpoint 503; and then adding together these the two values. For antialiasing, the interpolated color for sample point 505 must then be blended with the background color value found in the framebuffer. In order to find the bending factor, alpha, the minor axis distance must be computed. The minor axis distance is given by the barycentric coordinate of the artificially introduced point. In this case, the normalized minor axis distance is the barycentric coordinate corresponding to vertex 504. The barycentric coordinate corresponding to vertex 504 is then used as an index into a coverage table to determine the alpha value. The alpha value is then multiplied with the interpolated color value computed above for the sample point 505 to produce a modulated color value. This modulated color value is then blended with the background color value stored in the frame buffer to arrive at the final antialiased color value for sample point 505.

It should be noted that the present invention also works for sample points which fall outside of the main triangle (e.g., triangle defined by vertices 502–504) because although there may be some negative results, these negative numbers are compensated by larger positive results. Furthermore, because the barycentric coordinates are normalized (e.g., falls in a range of 0 to 1), the present invention works equally well for lines of any width.

Figure 6:
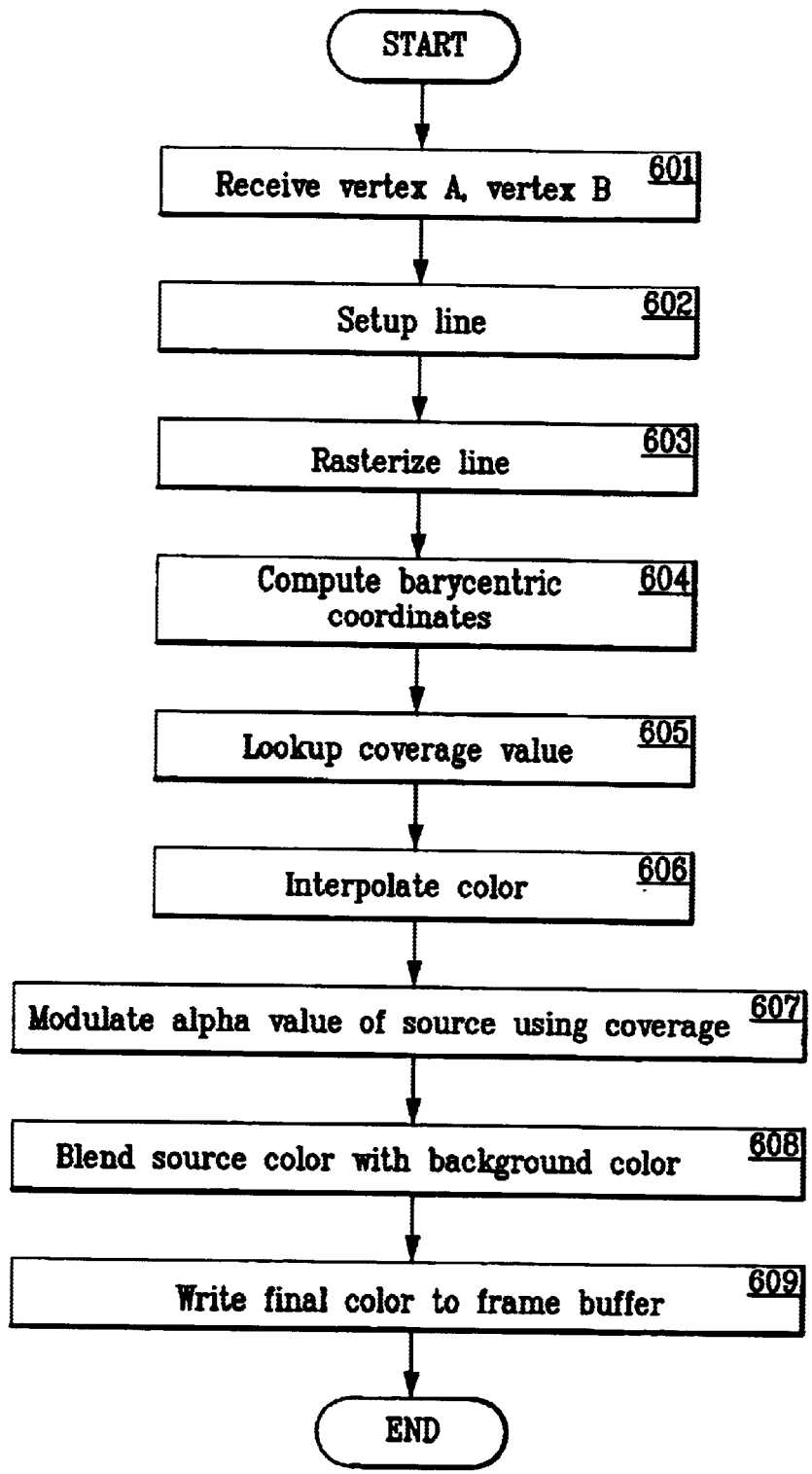
FIG. 6 is a flowchart describing the steps for performing antialiasing for a line by applying the principles of barycentric coordinates.

FIG. 6 is a flowchart describing the steps for performing antialiasing for line by applying the principles of barycentric coordinates. Initially, the vertices corresponding to the two endpoints which define the ideal line are received, step 601. Next, the line is set up, step 602. This entails determining the orientation of the line and setting up the rasterizer (e.g., loading the initial position). In step 603, the line is rasterized and the sample points are determined. Thereupon, the barycentric coordinates are computed in step 604. In step 605, the coverage value is determined by indexing the barycentric coordinate corresponding to the third vertex into a lookup table. The source color is found by interpolating the two endpoint colors, step 606. Based on the coverage value, the alpha value of the source is modulated, step 607. The source color is then blended with the background color, step 608. And the final blended color value is written back to the frame buffer for eventual display, step 609.

Figure 7:
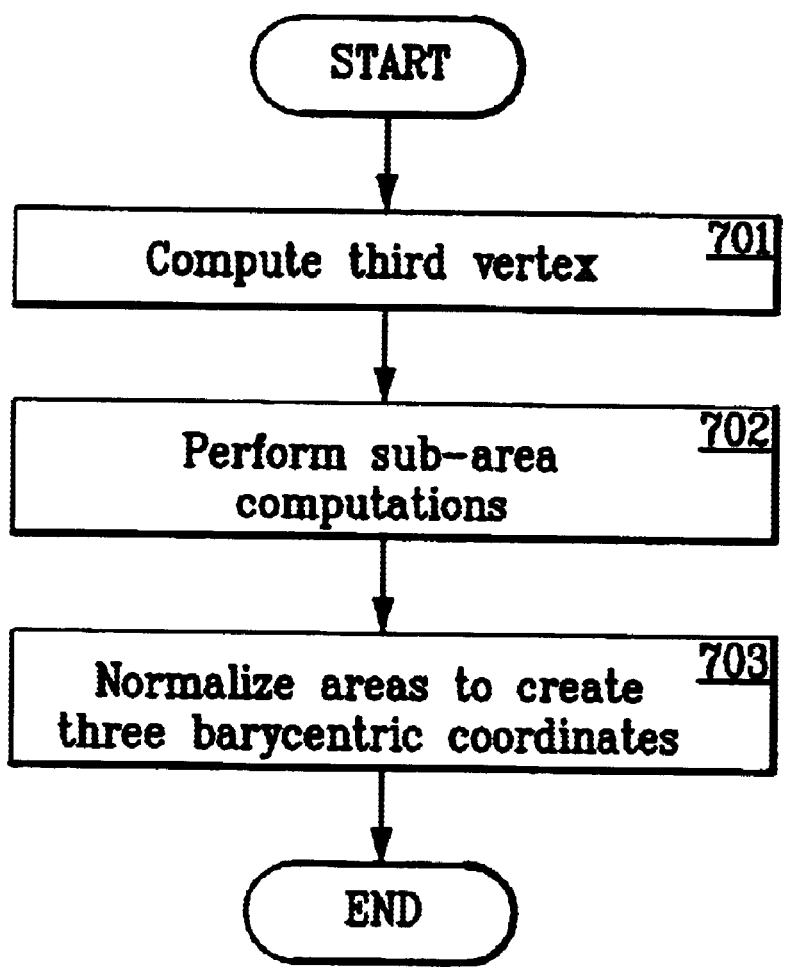
FIG. 7 is a flowchart describing the steps for computing the barycentric coordinates for a line.

FIG. 7 is a flowchart describing the steps for computing the barycentric coordinates for a line. The first step 701 entails creating a third vertex. Next, the subarea computations are performed, step 702. Finally, the areas are normalized to create the barycentric coordinates, step 703.

Figure 8:
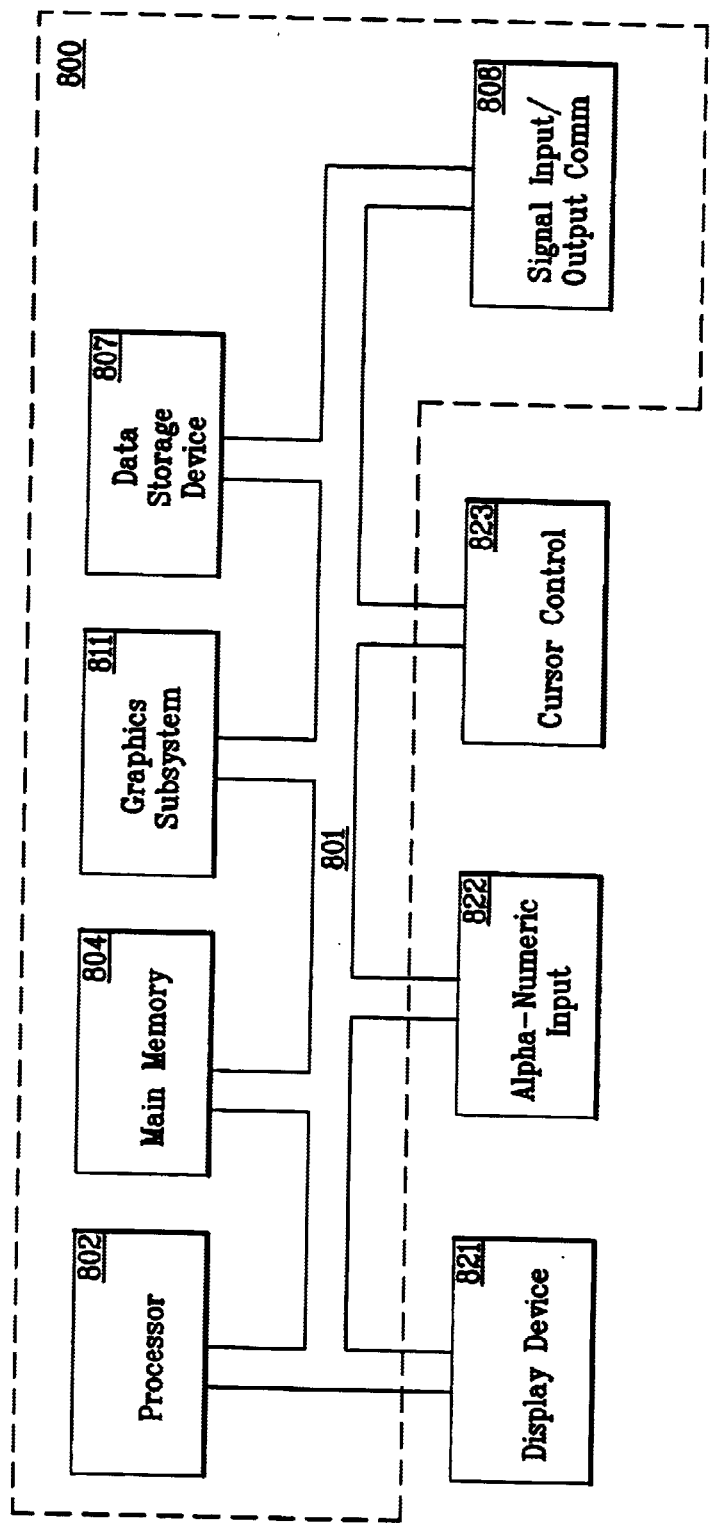
FIG. 8 shows an exemplary computer system upon which the present invention may be practiced.

FIG. 8 shows an exemplary computer system upon which the present invention may be practiced. System 800 can include any computer controlled graphics systems for generating complex or three-dimensional images. Computer system 800 comprises a bus or other communication means 801 for communicating information, and a processing means 802 coupled with bus 801 for processing information. System 800 further comprises a random access memory (RAM) or other dynamic storage device 804 (referred to as main memory), coupled to bus 801 for storing information and instructions to be executed by processor 802. Main memory 804 also may be used for storing temporary variables or other intermediate information during execution of instructions by processor 802. Data storage device 807 is coupled to bus 801 for storing information and instructions. Furthermore, an I/O device 808 is used for couple the computer system 800 onto a network.

Computer system 800 can also be coupled via bus 801 to an alphanumeric input device 822, including alphanumeric and other keys, is typically coupled to bus 801 for communicating information and command selections to processor 802. Another type of user input device is cursor control 823, such as a mouse, a trackball, or cursor direction keys for communicating direction information and command selections to processor 802 and for controlling cursor movement on display 821. This input device typically has two degrees of freedom in two axes, a first axis (e.g., x) and a second axis (e.g., y), which allows the device to specify positions in a plane.

Also coupled to bus 801 is a graphics subsystem 811. Processor 802 provides the graphics subsystem 811 with graphics data such as drawing commands, coordinate vertex data, and other data related to an object's geometric position, color, and texture parameters. The object data is processed by graphics subsystem 811 in the following four pipelined stages: geometry subsystem, scan conversion subsystem, raster subsystem, and a display subsystem. The geometry subsystem converts the graphical data from processor 802 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and antialiasing functions are performed. The texture hardware is contained in the raster subsystem. The resulting pixel values are stored in a frame buffer. The display subsystem reads the frame buffer and displays the image on display monitor 821.

It should be noted that present invention has the added advantage that the same hardware and software used for polygonal rasterization can also be used to perform a different function, thereby reducing expenses because no special, separate dedicated piece of hardware need be developed. The present invention can leverage off pre-existing circuitry.

Thus, a method for computing normalized minor axis distance to an ideal line for variable-width line antialiasing has been disclosed. The method described above involves performing line primitive setup by constructing a triangle from the two line vertices and a third vertex biased from a line endpoint by the line width/2. Normalized barycentric coordinates are computed for this triangle, which together can be used for primitive attribute interpolation. One of the barycentric coordinates contains the normalized minor-axis distance to the ideal line, which can be used with a slope-correct coverage table to compute coverage. Because the minor-axis distance is normalized, the coverage value is independent of line width.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method for performing antialiasing for a computer generated line of varying width, comprising the steps of:

specifying a first vertex, a second vertex, and a third vertex, wherein the first vertex and the second vertex are on the line of varying width, and the first vertex, the second vertex, and the third vertex define a polygon, each of the vertices having an associated color value;

specifying a point corresponding to a pixel;

computing three barycentric coordinates of the point corresponding to each of the vertices;

mapping the three barycentric coordinates into two barycentric coordinates corresponding to the endpoints of the line;

determining the minor axis distance from the point to the line;

determining the product of at least one of the two barycentric coordinates and the associated color value of the corresponding vertex;

interpolating a color value of the point responsive to the product;

determining an alpha value based on the minor axis distance; and determining a color of the pixel based on the color value of the point and the alpha value.

2. The method of claim 1, wherein the three barycentric coordinates are mapped to the two barycentric coordinates by adding a barycentric coordinate corresponding to the third vertex to a barycentric coordinate corresponding to the second vertex.

3. The method of claim 1, wherein the two barycentric coordinates corresponding to the endpoints are used to interpolate the pixel color.

4. The method of claim 1 further comprising the steps of:

storing a plurality of pre-computed coverage values in a table;

indexing the table as a function of at least one of the barycentric coordinates to determine a coverage value corresponding to the point, wherein the determining the color of the pixel is a function of the coverage value.

5. The method of claim 1, wherein the barycentric coordinates are computed by performing subarea computations.

6. A method for drawing a computer generated line of varying width for display on a display screen, comprising the steps of:

specifying a first vertex, a second vertex, and a third vertex, each of the vertices having an associated color value, wherein the first vertex and the second vertex define the line of varying width;

determining an orientation of the line of varying width;

rasterizing the line of varying width;

specifying a pixel;

computing three barycentric coordinates corresponding to the line of varying width as a function of the first vertex, the second vertex, and the third vertex;

mapping the three barycentric coordinates into two barycentric coordinates corresponding to the first vertex and the second vertex;

determining the minor axis distance from the pixel to the line;

determining a coverage value according to at least one of the two barycentric coordinates of the line;

interpolating a color value corresponding to the pixel responsive to the product of at least one of the two barycentric coordinates and the associated color value of the corresponding vertex;

determining an alpha value based on the minor axis distance;

modulating the alpha value according to the coverage value;

blending the color value corresponding to the pixel as a function of the alpha value with a background color value;

determining a color of the pixel based on the color value; and storing a blended color value in a frame buffer.

7. The method of claim 6, wherein a barycentric coordinate corresponding to the third vertex is added to a barycentric coordinate corresponding to the second vertex.

8. The method of claim 6, wherein the two barycentric coordinates are used to interpolate the pixel color.

9. The method of claim 6 further comprising the steps of:

storing a plurality of pre-computed coverage values in a table;

indexing the table as a function of at least one of the barycentric coordinates to determine the coverage value corresponding to the pixel, wherein the blending is performed as a function of the coverage value.

10. The method of claim 6, wherein the barycentric coordinates are computed by performing subarea computations.

11. A computer system comprising:

a bus;

a processor coupled to the bus;

a memory coupled to the bus, wherein the memory stores instructions for performing the computer-implemented steps of: specifying a first vertex, a second vertex, and a third vertex, each of the vertices having an associated color value, wherein the first vertex and the second vertex are on a line of varying width, wherein the first vertex, the second vertex, and the third vertex define a polygon; rasterizing the line of varying width, wherein the polygon is not rasterized; specifying a point corresponding to a pixel; computing three barycentric coordinates of the point corresponding to each of the vertices; mapping the three barycentric coordinates into two barycentric coordinates corresponding to the endpoints of the line; determining the minor axis distance from the point to the line; determining the product of at least one of the two barycentric coordinates and the associated color value of the corresponding vertex; interpolating a color value of the point responsive to the product; determining an alpha value based on the minor axis distance; and determining a color of the pixel based on the color value of the point and the alpha value.

12. The computer system of claim 11, wherein the two barycentric coordinates corresponding to the endpoints are used to interpolate the pixel color.

13. The computer system of claim 11, wherein the memory further contains instructions for storing a plurality of pre-computed coverage values in a table and indexing the table as a function of at least one of the barycentric coordinates to determine a coverage value corresponding to the point, wherein the determining the color of the pixel is a function of the coverage value.

14. The computer system of claim 11, wherein the barycentric coordinates are computed by performing subarea computations.

15. A method for drawing a computer generated image for display, comprising the steps of:

computing three barycentric coordinates corresponding to a line of varying width;

mapping the three barycentric coordinates into two barycentric coordinates corresponding to the endpoints of the line;

determining the minor axis distance from a point to the line;

determining a pixel color of the point using the two barycentric coordinates and an alpha value blending factor based on the minor axis distance to perform antialising on pixel colors corresponding to the line of varying width;

storing the pixel colors in a memory;

reading the pixel colors from memory; and displaying the line of varying width according to the pixel colors.

16. A computer readable medium having stored thereon instructions for drawing a computer generated image for display, comprising the steps of:

computing three barycentric coordinates corresponding to a line of varying width;

mapping the three barycentric coordinates into two barycentric coordinates corresponding to the endpoints of the line;

determining the minor axis distance from a point to the line;

determining a pixel color of the point using the two barycentric coordinates and an alpha value blending factor based on the minor axis distance to perform antialising on pixel colors corresponding to the line of varying width;

storing the pixel colors in a memory;

reading the pixel colors from memory; and displaying the line of varying width according to the pixel colors.

17. The method of claim 1, wherein determining the color of the pixel comprises:

multiplying the color value of the point by the alpha value to produce a modulated color; and blending the modulated color with a background color.

18. The system of claim 11, wherein the step of determining the color of the pixel comprises multiplying the color value of the point by the alpha value to produce a modulated color, and blending the modulated color with a background color.

19. The method of claim 15, wherein the step of determining the pixel color further comprises using a background color.

20. The computer readable medium of claim 16, wherein the step of determining the pixel color further comprises using a background color.

* * * * *